(12) United States Patent
Chien et al.

(10) Patent No.: US 9,734,873 B1
(45) Date of Patent: Aug. 15, 2017

(54) SCREWLESS DRAWING BOX FOR HARD DISK DRIVES AND HARD DISK DRIVE SWAPPABLE MODULE USING THE SAME

(71) Applicant: ECHOSTREAMS INNOVATIVE SOLUTIONS,LLC, Arcadia, CA (US)

(72) Inventors: Chih-Yung Chien, New Taipei (TW); Gene Jing-Luen Lee, New Taipei (TW)

(73) Assignee: ECHOSTREAMS INNOVATIVE SOLUTIONS, LLC, Arcadia, CA (US)

( * ) Notice: Subject to any disclaimer, the term of this patent is extended or adjusted under 35 U.S.C. 154(b) by 0 days.

(21) Appl. No.: 15/287,487

(22) Filed: Oct. 6, 2016

(30) Foreign Application Priority Data

Jun. 22, 2016 (TW) ............................. 105209364 U

(51) Int. Cl.
*G11B 33/02* (2006.01)
(52) U.S. Cl.
CPC .................. *G11B 33/022* (2013.01)
(58) Field of Classification Search
CPC .................................................. G11B 33/022
See application file for complete search history.

(56) References Cited

U.S. PATENT DOCUMENTS

| 6,075,695 | A  | * | 6/2000 | Konno | G11B 33/124 |
|           |    |   |        |       | 361/679.31 |
| 7,102,885 | B2 | * | 9/2006 | Chen  | G06F 1/184 |
|           |    |   |        |       | 361/679.31 |
| 9,052,878 | B2 | * | 6/2015 | Lo    | G06F 1/187 |
| 9,064,511 | B1 | * | 6/2015 | Yang  | G11B 5/39 |
| 2014/0211401 | A1 | * | 7/2014 | Lee | G06F 1/187 |
|           |    |   |        |       | 361/679.31 |

* cited by examiner

*Primary Examiner* — Lisa Lea Edmonds
(74) *Attorney, Agent, or Firm* — Li & Cai Intellectual Property (USA) Office

(57) ABSTRACT

A screwless hard disk drive (HDD) drawing box and a HDD swappable module are provided, which includes a HDD cartridge for receiving a hard disk drive. The HDD cartridge has a bottom board, and two sideboards connected to two opposite sides of the bottom board. The two side plates of the hard disk drive are close to the two sideboards. One of the sideboards has a plurality of fixing pins. The other sideboard of the HDD cartridge has a plurality of elastic snapping members opposite to the fixing pins. Each of the elastic snapping members has a snapping bump and an elastic element. Each snapping bump is arranged on the elastic element at the other sideboard of the HDD cartridge opposite to the fixing pins. The fixing pins and the snapping bumps are inserted in the thread holes of the two side plates of the hard disk drive.

10 Claims, 8 Drawing Sheets

SCREWLESS DRAWING BOX FOR HARD DISK DRIVES AND HARD DISK DRIVE SWAPPABLE MODULE USING THE SAME

BACKGROUND OF THE PRESENT INVENTION

1. Field of the Present Invention

The present invention relates to a screwless drawing box for hard disk drive (HDD) and a HDD swappable module using the same, particularly to a screwless HDD drawing box and a HDD swappable module that can be applied in information devices, such as a server, industrial computers, redundant array of independent disks (RAID), an external hard disk drive box, network attached storage (NAS) . . . etc.

2. Description of Related Art

The current information devices, such as servers, industrial computers, redundant array of independent disks (RAID), an external hard disk drive box, network attached storage (NAS) . . . etc, usually use an array HDD swappable module as storage device. Since network information has developed rapidly, the data storage capacity and density of information devices have steadily increased. Thus, the HDD swappable module needs to accommodate more HDDs.

The structure of HDD swappable modules usually includes a chassis for receiving the HDD, and the chassis is divided into a plurality of HDD slots. Each HDD slot can receive a swappable HDD drawing box. Therefore, by using the HDD drawing boxes, many HDDs can be received into the HDD chassis.

However, the current HDD drawing box usually uses screws to fix the HDD in the drawing box, which consumes much time assembling or replacing the HDD. Each of the HDDs needs to be screwed in each drawing box by screws, and the drawing box is inserted into the slot of the HDD chassis.

The current storage device can receive many HDDs, so that much time must be spent tightening or removing screws for assembling or replacing a plurality of HDDs. Thus, the work of replacing HDDs is troublesome and time-consuming.

To improve the problem of using screws to fix HDD in HDD drawing box, some conventional HDD drawing boxes replace the screws with a wedging member to fix HDD in the drawing box. Although such a kind of screwless drawing box can avoid the troublesome screws, this screwless HDD drawing box needs an additional wedging member. In addition, the wedging member usually is complex, so that the structure of the HDD drawing box is also complex accordingly causing the volume to be increased.

To address the above issues of conventional HDD swappable modules, the present disclosure improves the structure of HDD swappable modules to enhance the convenience of assembling or replacing the HDD, reduce time-consumption, and simplify structure. To overcome the above deficiency has become an important issue in this technology field.

SUMMARY OF THE PRESENT INVENTION

The object of the present invention is to provide a screwless hard disk drive drawing box and a hard disk drive swappable module to improve the disadvantages of assembling or replacing the HDD and the complex structure of the conventional hard disk drive swappable module.

In order to achieve the aforementioned objects, a screwless hard disk drive drawing box is provided according to an embodiment of the present invention, which includes a hard disk drive cartridge. The hard disk drive cartridge is inserted into a hard disk drive slot from an opening end of the hard disk drive slot. The hard disk drive cartridge has a bottom board, and two sideboards connected to two opposite sides of the bottom board. The bottom board and the two sideboards define a receiving space to receive a hard disk drive. When the hard disk drive is received in the receiving space, two side plates of the hard disk drive are close to the two sideboards. One of the sideboards of the hard disk drive cartridge has a plurality of fixing pins facing a side of the hard disk drive. The other one of the sideboards of the hard disk drive cartridge has a plurality of elastic snapping members opposite to the fixing pins. The fixing pins are fixedly formed on an inner side of the sideboard. Each of the elastic snapping members has a snapping bump and an elastic element. Each snapping bump is disposed on the elastic element at the other one of the sideboards of the hard disk drive cartridge opposite to the fixing pins. The elastic elements have elasticity and are deformable when the snapping bump is forced, and after a force applied to the snapping bumps is removed, the snapping bumps are able to recover to an original position before moving by the elasticity of elastic elements. The fixing pins and the snapping bumps are opposite to each other. The positions of the fixing pins and the snapping bump correspond to positions of the thread holes on the two side plates of the hard disk drive. Thus, the snapping bumps and the fixing pins are able to be inserted into the thread holes on the two side plates of the hard disk drive.

According to one preferred embodiment of the present invention, each of the elastic elements of the elastic snapping member is an elastic piece perpendicular to the bottom board, and each of the snapping bumps is disposed on the elastic element toward the hard disk drive.

According to one preferred embodiment of the present invention, at least one of the elastic elements of the elastic snapping member has a restricting projection formed on one side of the elastic element opposite to the snapping bump. The restricting projection is protruded from one side of the elastic element in a direction away from the side plate of the hard disk drive. When the hard disk drive drawing box is inserted into the hard disk drive slot, the restricting projection contacts an inner side of the hard disk drive slot facing the restricting projection, so that the elastic element is stopped from moving in a direction away from the hard disk drive.

According to one other preferred embodiment of the present invention, further providing a hard disk drive swappable module having the hard disk drive drawing box.

Based on the above, the present invention has advantages as follows. It can fix the hard disk drive in the hard disk drive drawing box without screws, so as to reduce the operating time of dismounting and replacing the hard disk drive, and simplify the structure of the hard disk drive drawing box and the hard disk drive swappable module.

In order to further appreciate the characteristics and technical contents of the present invention, references are hereunder made to the detailed descriptions and appended drawings in connection with the present invention. However, the appended drawings are merely shown for exemplary purposes, rather than being used to restrict the scope of the present invention.

DETAILED DESCRIPTION OF THE PREFERRED EMBODIMENTS

Figure 1:
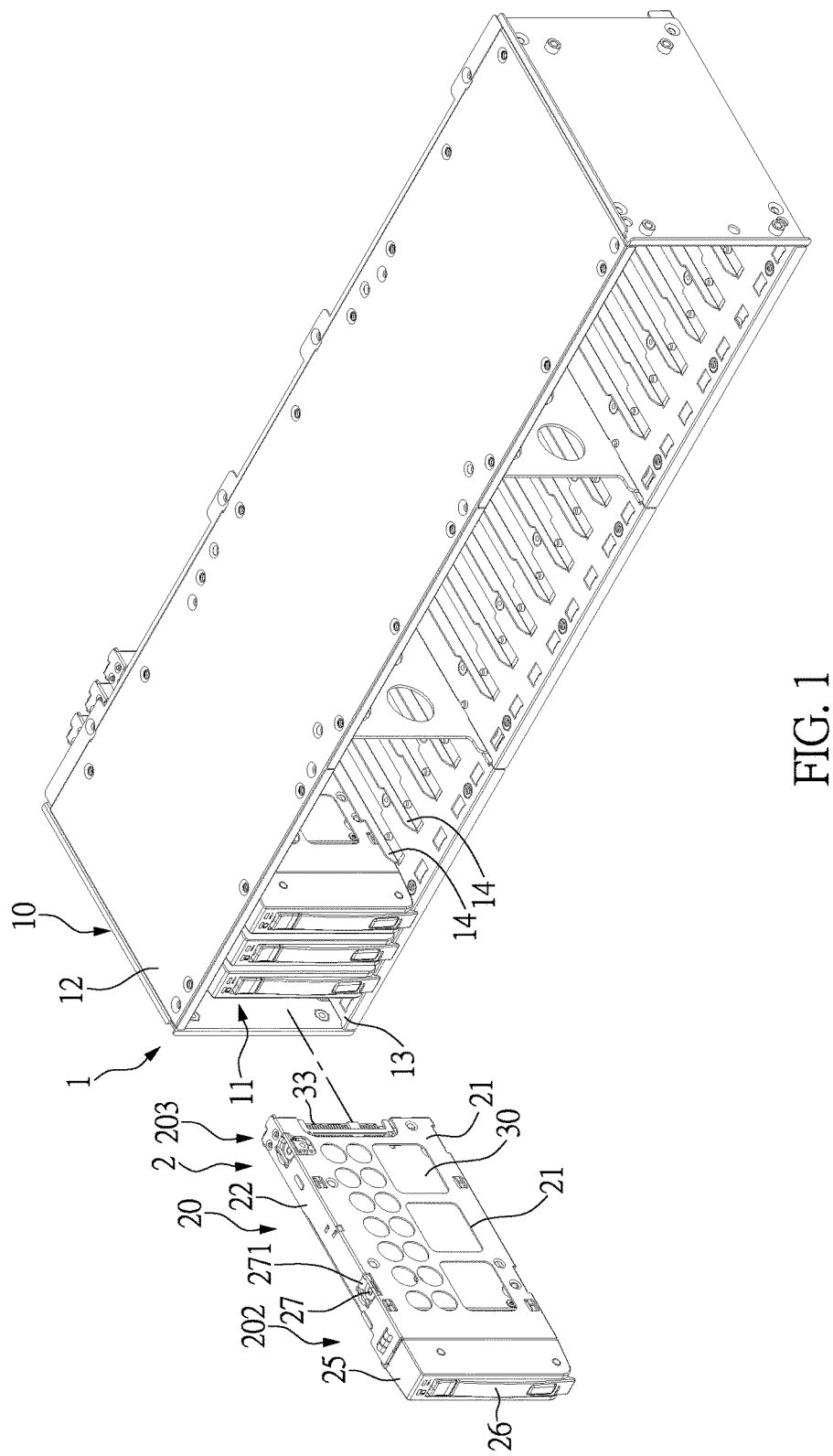
FIG. 1 is a perspective assembled view of a hard disk drive drawing box and a hard disk drive swappable module of the present disclosure.

Refer to FIG. 1, which shows a hard disk drive (HDD) swappable module 1 with a hard disk drive (HDD) drawing box 2. The HDD swappable module 1 has a chassis 10. The chassis 10 has a first base plate 12 and a second base plate 13, which are parallel to each other. The first base plate 12 and the second base plate 13 have an inner surface opposite to each other, respectively. The chassis 10 further has a plurality of guiding members 14, which are parallel to each other on the inner surfaces of the first base plate 12 and the second base plate 13. A space between the first base plate 12 and the second base plate 13 is divided into a plurality of HDD slots 11 parallel to each other. Each HDD slot 11 can receive an HDD drawing box 2 therein. By use of the HDD drawing boxes 2, a plurality of HDDs 30 can be swappable and assembled in the HDD slots 11. This embodiment is not limited to receive hard disk drives, and can be used to receive other kinds of data storage devices.

Figure 2:
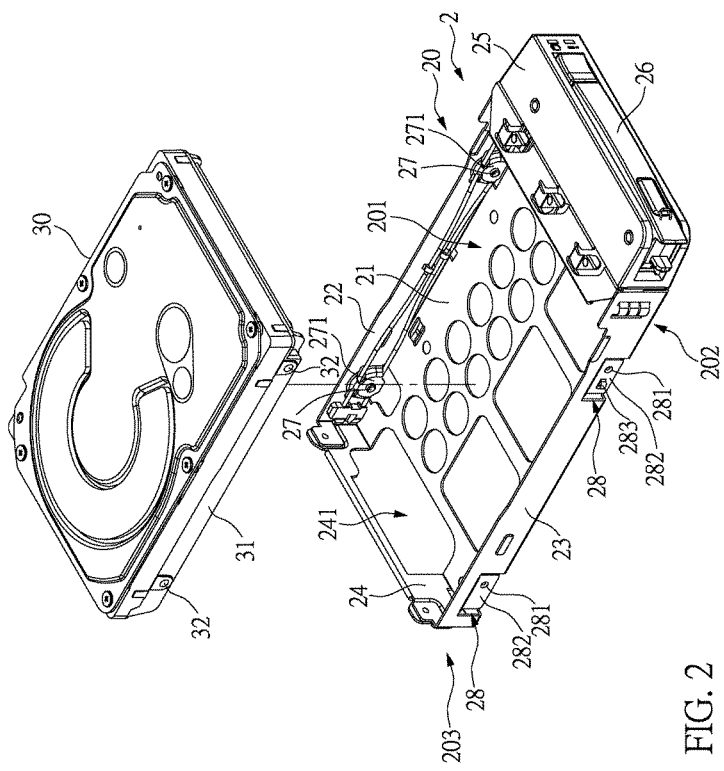
FIG. 2 is a perspective assembled view of the hard disk drive drawing box of the present disclosure.

As shown in FIG. 2, the HDD drawing box 2 includes an HDD cartridge 20. The HDD cartridge 20 has a bottom board 21, and two sideboards 22, 23 connected to two opposite sides of the bottom board 21. The bottom board 21 and the sideboards 22, 23 define a receiving space 201. A size of the receiving space 201 is slightly larger than a size of the HDD 30, so that the HDD 30 is able to be received in the receiving space 201.

Figure 3:
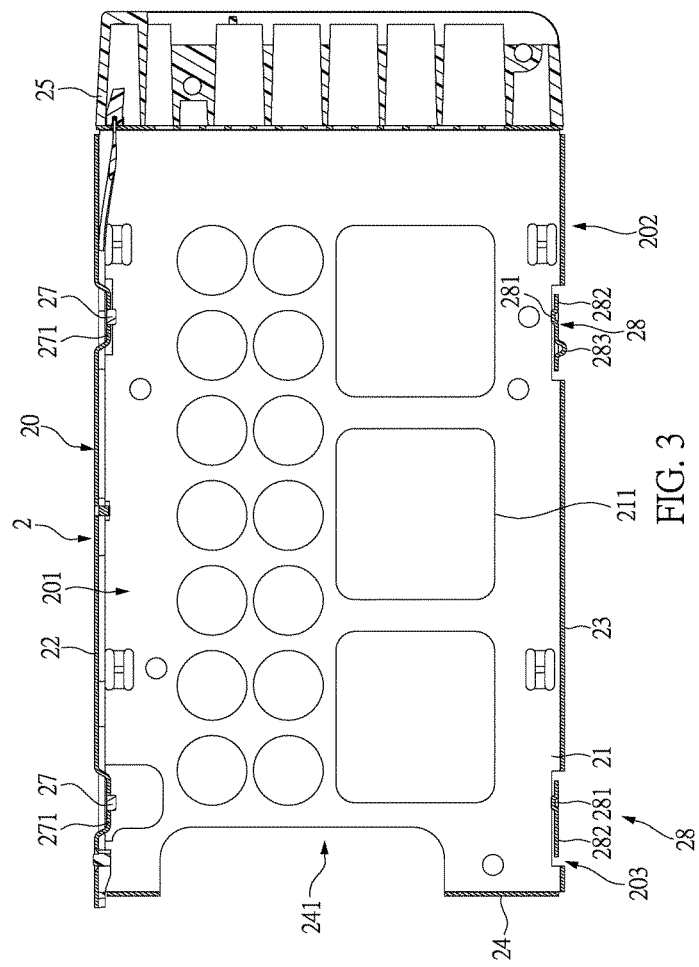
FIG. 3 is a cross-sectional view of the hard disk drive drawing box from a top viewpoint of the present disclosure.
Figure 6:
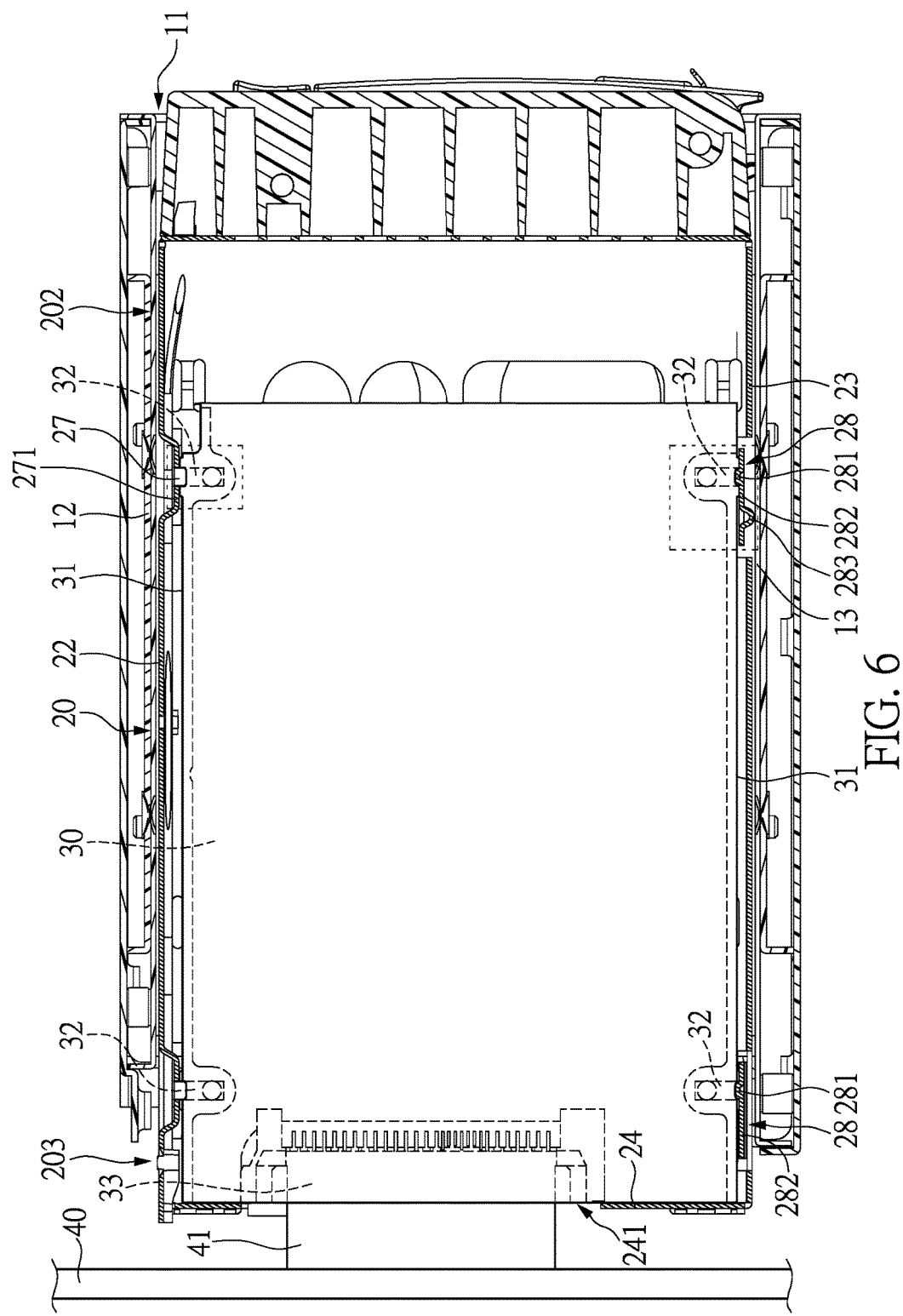
FIG. 6 is a cross-sectional view of the hard disk drive drawing box being inserted in a hard disk drive slot of the present disclosure.

The HDD cartridge 20 further has a front cover 25, a wrench handle 26 disposed on the front cover 25, and a rear stop board 24. The front cover 25 is connected to the bottom board 21 and the sideboards 22, 23. The rear stop board 24, opposite to the front cover 25, is connected to the bottom board 21 and the sideboards 22, 23. Refer to FIG. 3. A front edge of the rear stop board 24 has a cutout portion 241 which is formed at a central portion of the rear stop board 24 and at a central portion of the bottom board 21. The HDD cartridge 20 defines a front-end part 202 at one end closed to the front cover 25, and a rear-end part 203 at another end closed to the rear stop board 24. As shown in FIG. 1 and FIG. 6, the HDD cartridge 20 is able to inserted into the HDD slot 11 in a direction where the rear-end part 203 is toward the HDD slot 11. When the HDD cartridge 20 is inserted in the HDD slot 11, the sideboards 22, 23 of the HDD cartridge 20 are close to the first base plate 12 and the second base plate 13 of the chassis 10. Meanwhile, the rear-end part 203 is inserted to the very rear end of the HDD slot 11, and the front-end part 202 adjacent to the front cover 25 is arranged at an opening of the HDD slot 11.

As shown in FIG. 2 and FIG. 6, the HDD 30 has two side plates 31 parallel to each other. The side plates 31 have a plurality of thread holes 32, respectively. Further, a first electrical connector 33 is disposed at one end of the HDD 30. When the HDD 30 is assembled in the HDD cartridge 20, the two side plates 31 of the HDD 30 are close to the sideboards 22, 23. The end of the HDD 30 having the first electrical connector 33 is abutted against an inner side of the rear stop board 24. The first electrical connector 33 of the HDD 30 is exposed from the cutout portion 241.

Refer to FIG. 6. When the HDD swappable module 1 is assembled in an information device, a rear end of the HDD slot 11 of the HDD swappable module 1 faces a circuit board 40. The circuit board 40 has a second electrical connector 41 corresponding to the rear end of the HDD slot 11. When the HDD 30 is received in the HDD cartridge 20 and is inserted in the HDD slot 11 to a fixed position, the first electrical connector 33 of the HDD 30 is connected and electrically coupled with the second electrical connector 41.

The present disclosure has a feature such that the HDD drawing box 2 can fix the HDD 30 in the HDD cartridge 20 without screws, so that the objective of the HDD 30 being quickly assembled or removed is achieved. As shown in FIG. 2 and FIG. 3, in this present disclosure, the HDD cartridge 20 has a fixing structure to fix the HDD as follows. In this embodiment, one of the sideboards 22 of the HDD cartridge 20 is formed with a plurality of fixing pins 27 on an inner surface thereof. Meanwhile, the other one of the sideboards 23 has a plurality of elastic snapping members 28 on an inner surface thereof. The fixing pins 27 and the elastic snapping members 28 are cooperatively engaged in the thread holes 32 on the side plates 31 of the HDD 30, respectively, so that the HDD 30 is wedged fixedly in the receiving space 201 of the HDD cartridge 20.

In this embodiment, the fixing pins 27 are fixed on the inner surface of the sideboard 22. The positions of the fixing pins 27 are corresponded to positions of the thread holes 32 on the side plate 31 of the HDD 30, so that the fixing pins 27 can be wedged in the thread holes 32 on the side plate 31 of the HDD 30.

Refer to FIG. 2, FIG. 3 and FIG. 6. In this embodiment, the sideboard 22 has a plurality of mounting seats 271 formed on its inner surface by a punching manner, and each mounting seat 271 has an end plane. The end plane of the mounting seat 271 is protruded from the inner surface of the sideboard 22 toward the side plate 31 of the HDD 30. The fixing pins 27 are respectively assembled on a plurality of mounting seats 271 in a rivet manner. When the HDD 30 is assembled in the HDD cartridge 20, the side plate 31 of the HDD 30 is abutted against the end plane of the mounting seat 271. A gap is kept between the side plate 31 of the HDD 30 and the inner surface of the sideboard 22. The function of the mounting seats 271 is to restrict the contacting position between the side plate 31 of the HDD 30 and the side plate 22 of the HDD cartridge 20 within the end plane of the mounting seat 271. Thus, the HDD 30 will not interfere with the inner surface of the sideboard 22 when the HDD 30 is installed in the HDD cartridge 20. The HDD 30 is more easily positioned.

Each of the elastic snapping members 28 has a snapping bump 281 and an elastic element 282. The snapping bumps 281 are opposite to the fixing pins 27 and fixed on one side of the HDD cartridge 20 by the elastic elements 282. In this embodiment, the elastic element 282 is an elastic piece perpendicular to the bottom board 21. The snapping bumps 281 are protruded from the elastic element 282 toward the side plate 31 of the HDD 30.

The elastic element 282 can be elastically deformed when it is forced, and the snapping bump 281 is movable after being forced. When an external force acted on the snapping bump 281 is removed, the snapping bump 281 is recovered to an original position before it is forced by the elasticity force of the elastic element 282.

Figure 4:
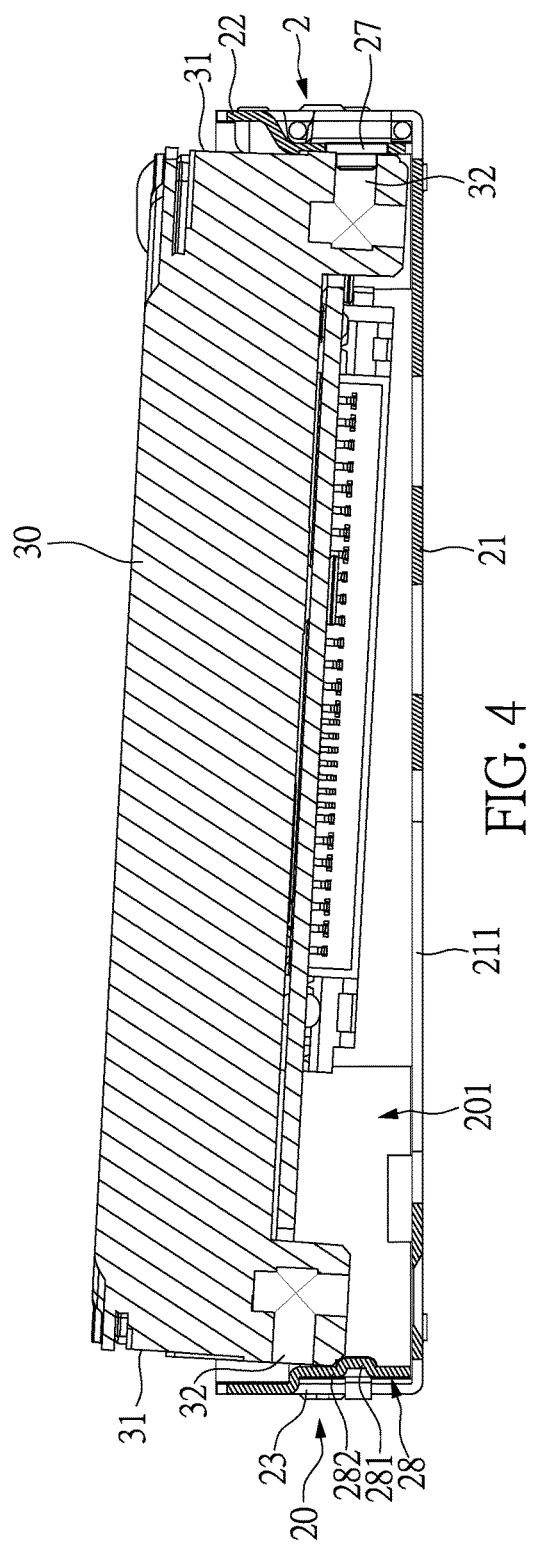
FIG. 4 and FIG. 5 show cross-sectional views of a hard disk drive being assembled in a hard disk drive cartridge of the hard disk drive drawing box of the present disclosure.
Figure 5:
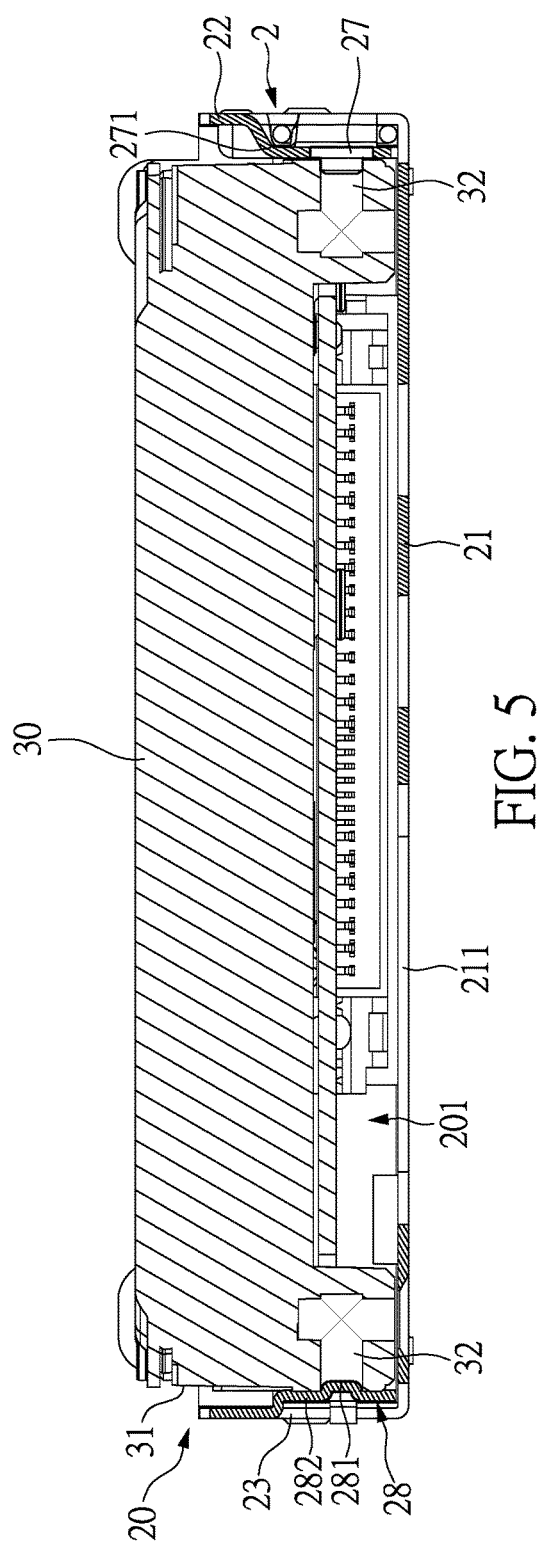

Refer to FIG. 3 to FIG. 5. A direction of the fixing pin 27 is opposite to a direction of the snapping bump 281. The positions of the fixing pins 27 and the snapping bumps 281 are corresponded to the positions of the thread holes 32 formed on the two side plates 31 of the HDD 30. Therefore, the fixing pins 27 and the snapping bumps 281 can be inserted into the thread holes 32 formed on two side plates 31 of the HDD 30, so as to fix the HDD 30 in the HDD cartridge 20.

Refer to FIG. 4. During the assembly of the HDD 30 into the HDD cartridge 20 according to the present disclosure, a user firstly arranges the HDD 30 in an oblique manner towards the fixing pins 27 and disposes it into the receiving space of the HDD cartridge 20, to make the thread holes 32 of the HDD 30 towards the fixing pins 27 be wedged with the fixing pins 27 in an oblique manner. Finally, a bottom edge of the other side of the HDD 30 is pushed across the snapping bumps 281 of the elastic snapping member 28.

Refer to FIG. 5. The snapping bumps 281 are installed on the elastic element 282 which is flexible. When a user pushes the end of the HDD 30 facing the snapping bumps 281 downward, the snapping bumps 281 will be squeezed by the bottom edge of the HDD 30. A force away from the side plate 31 of the HDD 30 is generated to push the snapping bumps 281, and the snapping bumps 281 are pushed outward. After the snapping bumps 281 are pushed by the bottom edge of the HDD 30, the end of the HDD 30 facing the snapping bumps 281 is able to move downward until the bottom of the HDD 30 contacts with the bottom board 21 of the HDD cartridge 20. As one side of the HDD 30 facing the snapping bumps 281 is pressing downward in the HDD cartridge 20, the snapping bumps 281 are pushed by the HDD 30. The tips of the snapping bumps 281 are continuously contacting with the side plate 31 of the HDD 30 by the elastic force of elastic element 282. Until the HDD 30 is fully pressed in the HDD cartridge 20, the snapping bumps 281 are aligned with the thread holes 32 on the side plate 31 of the HDD 30. After the pressing force exerted on the side plate 31 of the HDD 30 on the snapping bumps 281 is removed, the snapping bumps 281 are able to wedge in the thread holes 32 by the elastic force of the elastic element 282. Therefore, the one side of the HDD 30 facing the snapping bumps 281 is fixed in the HDD cartridge 20.

Through the above fixing structure in the HDD drawing box 2 according to the present disclosure, the HDD 30 can be fixed in the HDD cartridge 20 without any screw. In the similar way, a user can remove the HDD 30 from the HDD cartridge 20 in a reverse order of the above assembling steps, and the HDD 30 is able to be removed out from the HDD cartridge 20.

Refer to FIG. 3. The bottom board 21 of the HDD cartridge 20, which faces the elastic snapping member 28, is formed with a plurality of engraved portions 211. The engraved portions 211 have a width which is enough for a finger of a user to pass therethrough. A user's finger therefore can pass through the engraved portions 211 of the bottom board 21, when a user wants to move the HDD 30 out from the HDD cartridge 20. Just one side of the HDD 30 needs to be pushed, which is close to the snapping bump 281, in a direction of away from the bottom board 21, so that the thread holes 32 escape from the snapping bump 281 of the HDD 30. In this condition, the HDD 30 is in a situation as shown in FIG. 4, so that the HDD 30 can be taken out from the HDD cartridge 20.

Figure 7:
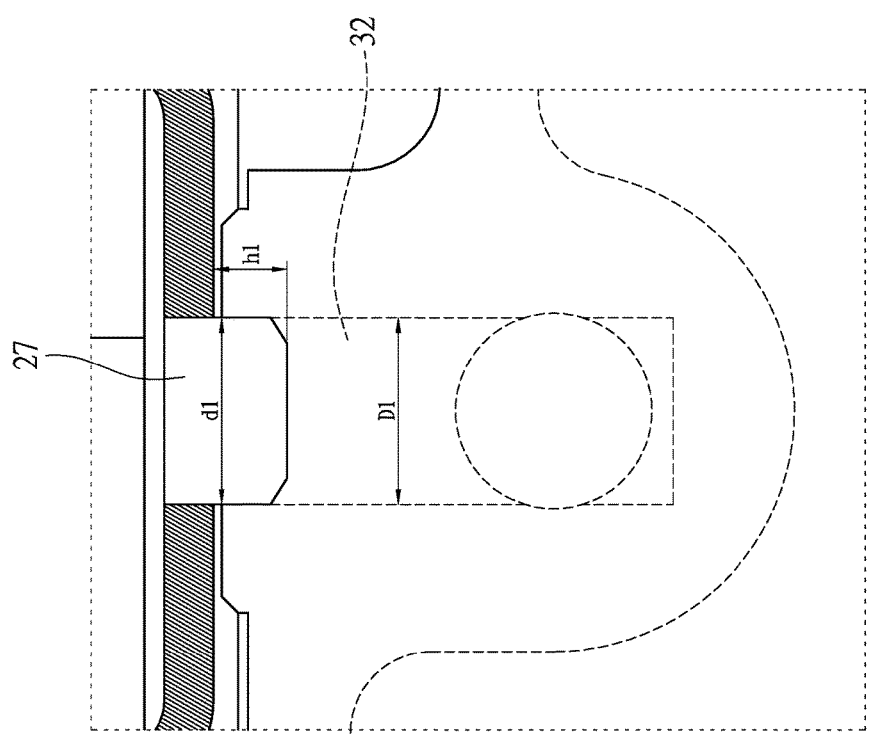
FIG. 7 is a cross-sectional enlarged view of the hard disk drive cartridge showing a fixing pin of the hard disk drive cartridge of the present disclosure.

In order to assemble the HDD 30 in the HDD cartridge 20 without interference from the fixing pin 27, smoothly wedged with the snapping bumps 281, the shapes and sizes of the fixing pin 27 and the snapping bump 281 are designed precisely. As shown in FIG. 7, the fixing pin 27 of this present disclosure is substantially cylindrical-shaped. The size of the fixing pin 27 is correspondingly matched with the size of the thread hole 32 of the HDD 30. In this embodiment, the HDD 30 can be an HDD of 2.5 inches. According to the specification of the HDD of 2.5 inches, a diameter d1 of the thread hole 32 of the HDD 30 is about 2.45 mm. Thus, by this embodiment, a diameter d1 of the fixing pin 27 can be designed as 2.4±0.05 mm, so that the fixing pin 27 can be stably wedged with and fixed in the thread hole 32 after inserting. This can prevent the HDD 30 from shaking. In addition, because the fixing pins 27 and the thread holes 32 on the side plate 31 of the HDD 30 will be slanted to each other, as the HDD 30 is disposed in the HDD cartridge 20, an interference may happen as the fixing pin 27 is wedged into the thread hole 32. Thus, a height h1 of the fixing pin 27 protruded beyond the side plate 31 is designed between 1 mm to 2 mm.

Figure 8:
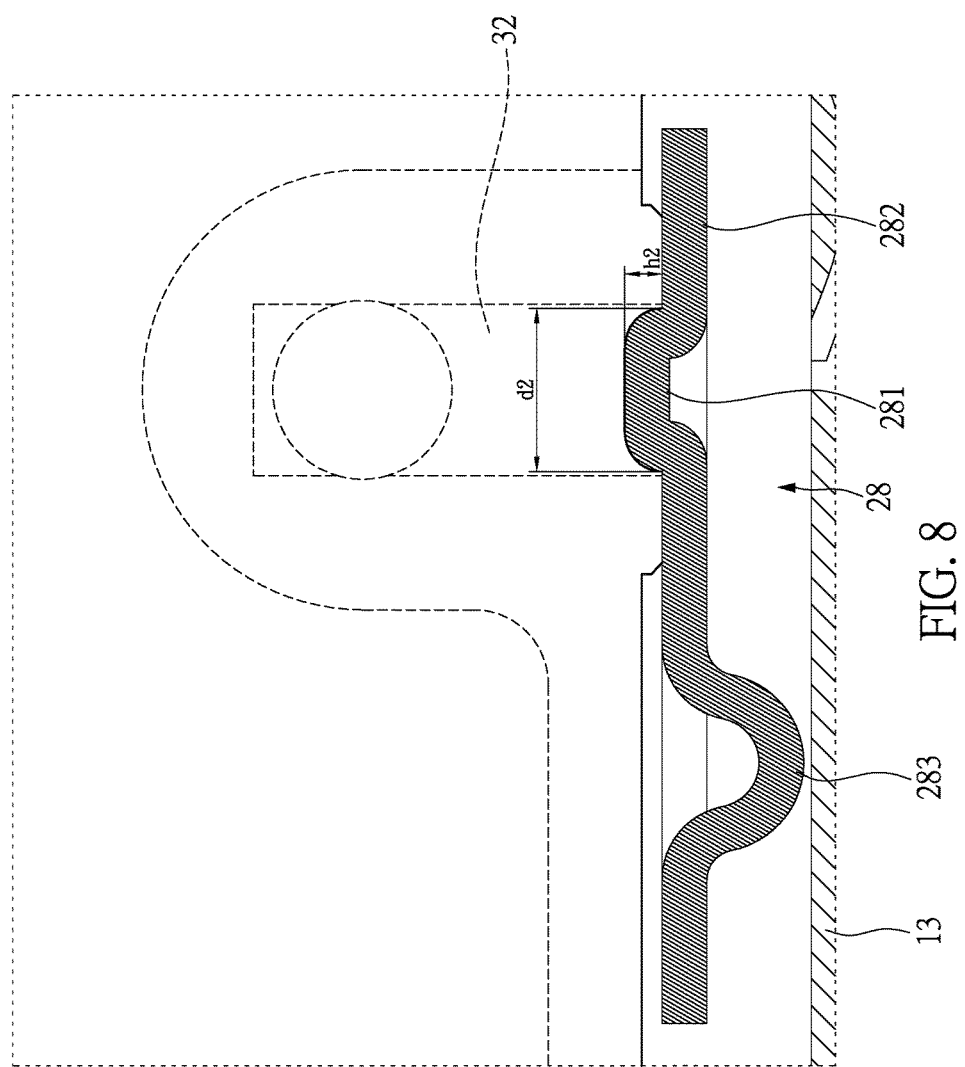
FIG. 8 is a cross-sectional enlarged view of the hard disk drive cartridge showing an elastic snapping member of the hard disk drive cartridge of the present disclosure.

Refer to FIG. 8. In this embodiment, the snapping bump 281 is formed by punching in the elastic element 282 integrally. The end of the snapping bump 281 has an arc curved surface, so that the snapping bump 281 can be smoothly wedged into the thread hole 32 on the side plate 31 of the HDD 30. In addition, a diameter d2 of snapping bump 281 is designed as 2.3±0.1 mm. The height h2 of snapping bump 281 is designed between 0.5 mm to 1 mm, so that the snapping bump 281 is easily wedged into the thread hole 32.

In order to prevent the snapping bumps 281 of the elastic snapping member 28 from escaping from the thread holes 32 of the HDD 30 resulting in a loosening of the HDD 30, at least one elastic snapping member 28 has a restricting projection 283 formed on one side of the elastic element 282 opposite to the snapping bump 281. As shown in FIG. 1, FIG. 3 and FIG. 6, the restricting projection 283 is integrally formed by punching in an outer side of the elastic element 282. The restricting projection 283 is protruded from one side of the elastic element 282 in a direction away from the side plate 31 of the HDD 30. As shown in FIG. 6, when the HDD drawing box is inserted into the HDD slot 11, the restricting projection 283 can contact an inner side of the HDD slot 11 facing the restricting projection 283, so that the elastic element 282 formed with the restricting projection 283 can be stopped from moving toward the first base plate 12.

After the HDD cartridge 20 is inserted in the HDD slot 11, as shown in FIG. 6, the elastic element 282 of the elastic snapping member 28 having the restricting projection 283 is restricted by the restricting projection 283 and will not move away from the side plate 31 of the HDD 30. Therefore, this embodiment can prevent the snapping bumps 281 from escaping from the thread holes 32 of the HDD 30, and achieve the objective of anti-loosening of the HDD 30.

Further, as shown in FIG. 6, in this embodiment, the restricting projection 283 of the HDD cartridge 20 is only formed on the elastic element 282 of the elastic snapping member 28 close to the front-end part 202, but the elastic snapping member 28 close to the rear-end part 203 has no the restricting projection 283. The objective of this design in this embodiment is as follows. The outside of the elastic snapping member 28 close to the rear-end part 203 of the HDD cartridge 20 has no protrusive restricting projection 283, so that the elastic snapping member 28 on the rear-end part 203 will not rub against the inner side of the first base plate 12 of the HDD slot 11 as the HDD cartridge 20 is inserted into the HDD slot 11. Thus, the HDD cartridge 20 can be more smoothly inserted into the HDD slot 11.

Refer to FIG. 6. Among the elastic snapping members 28 in the HDD cartridge 20, only the elastic snapping member 28 on the rear-end part 203 has no the restricting projection 283, and cannot restrain the snapping bumps 281 on the rear-end part 203 from escaping from the thread holes 32 of the HDD 30 by the restricting projection 283. However, the rear end of the HDD 30 already has the first electrical connector 33, and the first electrical connector 33 is plugged with the second electrical connector 41 of the circuit board 40 after the HDD 30 is inserted into the HDD slot 11. Thus, a fixing function between the first electrical connector 33 on the rear end of the HDD 30 and the second electrical connector 41 is enough to limit a displacement of the rear-end part of the HDD 30 from shaking. The design of this embodiment, that the elastic snapping member 28 on the rear-end part 203 of the HDD cartridge 20 without the restricting projection 283, therefore will not affect the fixing effect of the HDD 30.

The beneficial results of this instant disclosure is as follows. The HDD swappable module 1 uses the HDD drawing box 2, which can fix the HDD 30 in the drawing box without screws, so that the HDD can be quickly replaced to simplify maintainance work. In addition, the HDD drawing box of this instant disclosure adopts the fixing pin 27 and the elastic snapping member 28, which are simple structures, so that the HDD drawing box 2 is simplified.

The descriptions illustrated supra set forth simply the preferred embodiments of the present invention; however, the characteristics of the present invention are by no means restricted thereto. All changes, alterations, or modifications conveniently considered by those skilled in the art are deemed to be encompassed within the scope of the present invention delineated by the following claims.

What is claimed is:

1. A screwless hard disk drive drawing box, used to fix a hard disk drive in a hard disk drive slot of a hard disk drive swappable module, the hard disk drive having two parallel side plates, each of the side plates having a plurality of thread holes, the hard disk drive drawing box comprising:
    a hard disk drive cartridge, being able to insert into the hard disk drive slot from an opening end of the hard disk drive slot, wherein the hard disk drive cartridge has a bottom board, two sideboards connected to two opposite sides of the bottom board, and a receiving space defined by the bottom board and the two sideboards cooperatively; wherein the hard disk drive is able to be received in the receiving space, and the two side plates of the hard disk drive are close to the two sideboards respectively when the hard disk drive is received in the receiving space;
    wherein the hard disk drive cartridge has a plurality of fixing pins formed on one of the sideboards facing a side of the hard disk drive, and a plurality of elastic snapping members formed on the other one of the sideboards opposite to the fixing pins;
    wherein the fixing pins are fixedly formed on an inner side of the sideboard; wherein each of the elastic snapping members has a snapping bump and an elastic element, each snapping bump is disposed on the elastic element at the other one of the sideboards of the hard disk drive cartridge opposite to the fixing pins, the elastic elements have elasticity and are deformable when the snapping bump is forced, and after a force applied on the snapping bumps is removed, the snapping bumps are able to recover to an original position before moving by the elasticity of elastic elements;
    wherein the fixing pins and the snapping bumps are opposite to each other, and wherein positions of the fixing pins and the snapping bump are corresponded to positions of the thread holes on the two side plates of the hard disk drive, thereby the snapping bumps and the fixing pins are able to insert into the thread holes on the two side plates of the hard disk drive.

2. The screwless hard disk drive drawing box according to claim 1, wherein each of the elastic elements of the elastic snapping member is an elastic piece perpendicular to the bottom board, each of the snapping bumps is disposed on the elastic element toward the hard disk drive.

3. The screwless hard disk drive drawing box according to claim 2, wherein at least one of the elastic elements of the elastic snapping member has a restricting projection formed on one side of the elastic element opposite to the snapping bump, wherein the restricting projection is protruded from one side of the elastic element in a direction away from the side plate of the hard disk drive; when the hard disk drive drawing box is inserted into the hard disk drive slot, the restricting projection contacts an inner side of the hard disk drive slot facing the restricting projection, so that the elastic element is stopped from moving in a direction away from the hard disk drive.

4. The screwless hard disk drive drawing box according to claim 3, wherein the hard disk drive cartridge defines a front-end part and a rear-end part along a direction of the hard disk drive cartridge inserting into the hard disk drive slot, wherein the hard disk drive cartridge is inserted into the hard disk drive slot from the rear-end part toward the hard disk drive slot; wherein the elastic snapping members are disposed corresponding to the front-end part and the rear-end part, and the restricting projection of the elastic element is arranged on the elastic snapping member close to the front-end part, and the elastic element of the elastic snapping member close to the rear-end part has no the restricting projection.

5. The screwless hard disk drive drawing box according to claim 4, wherein each of the fixing pins is cylindrical-shaped having a diameter of 2.4±0.05 mm and a height between 1 mm to 2 mm; each of the snapping bumps is a cylindrical-shaped protrusion having a diameter of 2.3±0.1 mm and a height between 0.5 mm to 1 mm, and each of the snapping bumps has an arc curved surface on an end thereof.

6. A hard disk drive swappable module, for receiving a plurality of hard disk drives, each hard disk drive comprising:
    a chassis having two base plates parallel to each other with an interval, and a plurality of hard disk drive slots are defined between the two base plates;
    a plurality of hard disk drive drawing boxes, being respectively inserted the hard disk drive slots, wherein each of the hard disk drive drawing boxes includes:
        a hard disk drive cartridge, being inserted in the hard disk drive slot from an opening end of the hard disk drive slot, wherein the hard disk drive cartridge has a bottom board, two sideboards connected to two opposite sides of the bottom board, and a receiving space defined by the bottom board and the sideboards to receive a hard disk drive; when the hard disk drive is disposed in the receiving space, the hard disk drive having two side plates adjacent to the two sideboards;

wherein the hard disk drive cartridge has a plurality of fixing pins on one of the sideboards toward the hard disk drive, and a plurality of elastic snapping members formed on the other sideboard opposite to the fixing pins;

wherein the fixing pins are fixedly formed on an inner side of the sideboard; wherein each of the elastic snapping members has a snapping bump and an elastic element, each snapping bump is disposed formed on the other one of the sideboards of the hard disk drive cartridge opposite to the fixing pins through the elastic element, the elastic elements have elasticity and are deformable when the snapping bump is forced, and after a force applied on the snapping bumps is removed, the snapping bumps are able to recover to an original position before moving by the elasticity of elastic elements;

wherein the fixing pins and the snapping bumps are opposite to each other, and wherein positions of the fixing pins and the snapping bump are corresponded to positions of the thread holes on the two side plates of the hard disk drive, thereby the snapping bumps and the fixing pins are able to insert into the thread holes on the two side plates of the hard disk drive.

7. The hard disk drive swappable module according to claim 6, wherein each of the elastic elements of the elastic snapping member is an elastic piece perpendicular to the bottom board, each of the snapping bumps is disposed on the elastic element toward the hard disk drive.

8. The hard disk drive swappable module according to claim 7, wherein at least one of the elastic elements of the elastic snapping member has a restricting projection formed on one side of the elastic element opposite to the snapping bump, wherein the restricting projection is protruded from one side of the elastic element in a direction away from the side plate of the hard disk drive; when the hard disk drive drawing box is inserted into the hard disk drive slot, the restricting projection contacts an inner side of the hard disk drive slot facing the restricting projection, so that the elastic element is stopped from moving in a direction away from the hard disk drive.

9. The hard disk drive swappable module according to claim 8, wherein the hard disk drive cartridge defines a front-end part and a rear-end part along a direction of the hard disk drive cartridge inserting into the hard disk drive slot, wherein the hard disk drive cartridge is inserted into the hard disk drive slot from the rear-end part toward the hard disk drive slot; wherein the elastic snapping members are disposed corresponding to the front-end part and the rear-end part, and the restricting projection of the elastic element is arranged on the elastic snapping member close to the front-end part, and the elastic element of the elastic snapping member close to the rear-end part has no the restricting projection.

10. The hard disk drive swappable module according to claim 9, wherein each of the fixing pins is cylindrical-shaped having a diameter of 2.4±0.05 mm and a height between 1 mm to 2 mm; each of the snapping bumps is a cylindrical-shaped protrusion having a diameter of 2.3±0.1 mm and a height between 0.5 mm to 1 mm, and each of the snapping bumps has an arc curved surface on an end thereof.

* * * * *